United States Patent [19]
Springer et al.

[11] Patent Number: 6,032,416
[45] Date of Patent: Mar. 7, 2000

[54] TRANSIT VEHICLE DOOR

[75] Inventors: Serge Springer, Montreal; Pierre Rainville, Ville St-Laurent, both of Canada

[73] Assignee: Westinghouse Air Brake Company, Wilmerding, Pa.

[21] Appl. No.: 09/099,260

[22] Filed: Jun. 18, 1998

[51] Int. Cl.⁷ .................................................... E05C 7/06
[52] U.S. Cl. ................................................ 49/119; 49/118
[58] Field of Search ............................. 49/116, 117, 118, 49/119, 120, 208, 209, 210, 211, 216, 218, 219, 220, 140, 141

[56] References Cited

U.S. PATENT DOCUMENTS

| | | | |
|---|---|---|---|
| 4,087,939 | 5/1978 | Elguinoy et al. | 49/118 |
| 4,091,570 | 5/1978 | Favrel | 49/118 |
| 4,457,108 | 7/1984 | Kuschel et al. | 49/118 X |
| 4,543,746 | 10/1985 | Raeca | 49/118 |
| 5,271,181 | 12/1993 | Pietro | 49/118 |
| 5,483,769 | 1/1996 | Zwesili | 49/118 |
| 5,893,236 | 4/1999 | Krbec et al. | 49/118 |

*Primary Examiner*—Jerry Redman
*Attorney, Agent, or Firm*—James Ray & Associates

[57] ABSTRACT

The present invention is a bi-parting door system for transit vehicles. It has two doors mounted for movement in opposite directions and a motor for opening and closing them. It has at least one lock having a lock member for locking the doors in a closed position. The lock member is biased toward the locking position and moveable to an unlocking position by an actuator controlled by a control system which also controls the motor. When the doors are closed they experience a biasing force tending to open them and this biasing force is reacted by the lock member to generate a load on the lock member which prevents it from moving as a result of a spurious signal to the actuator. Unlocking of the doors requires a door closing signal to be received by the motor to remove the load from the lock member, as well as an unlocking signal to the actuator. Hence, the doors cannot be opened by any one spurious signal to either the motor or to the actuator.

27 Claims, 15 Drawing Sheets

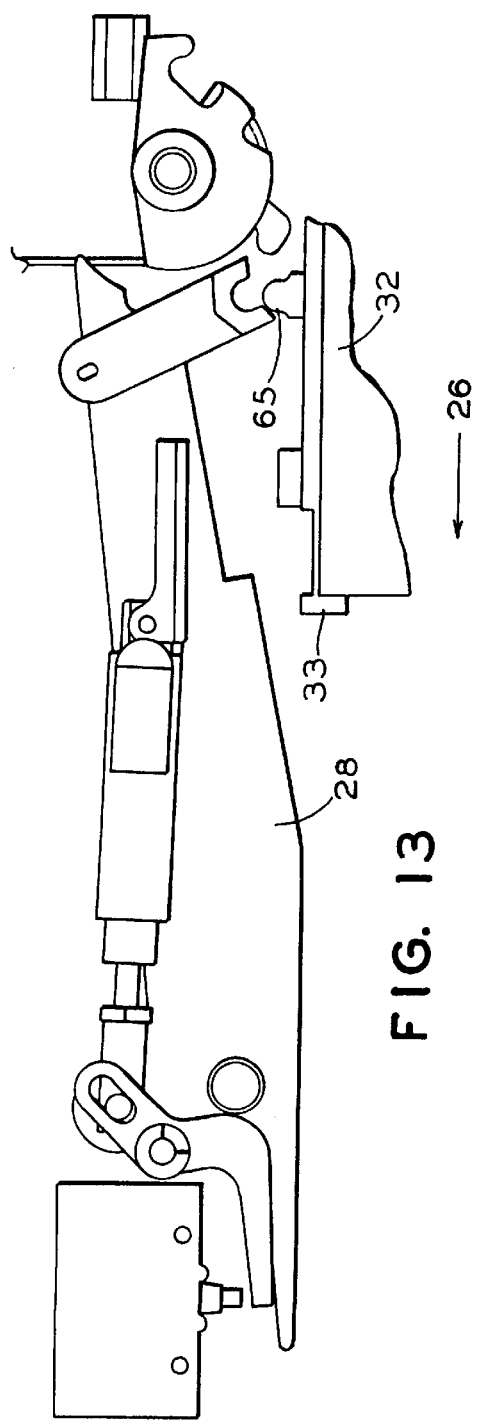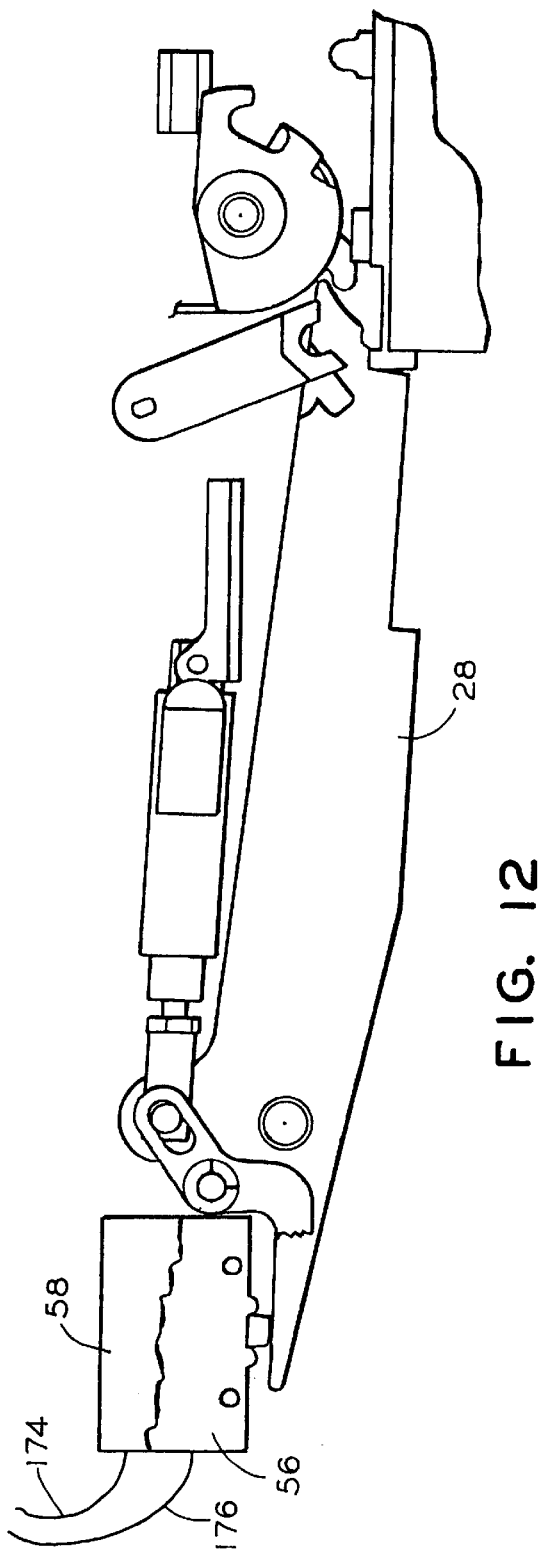

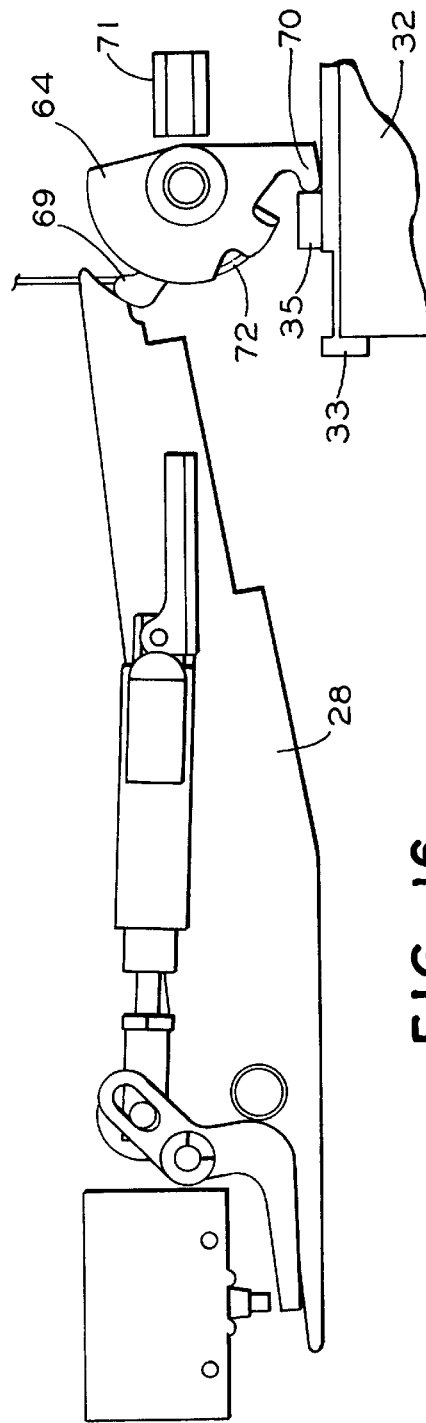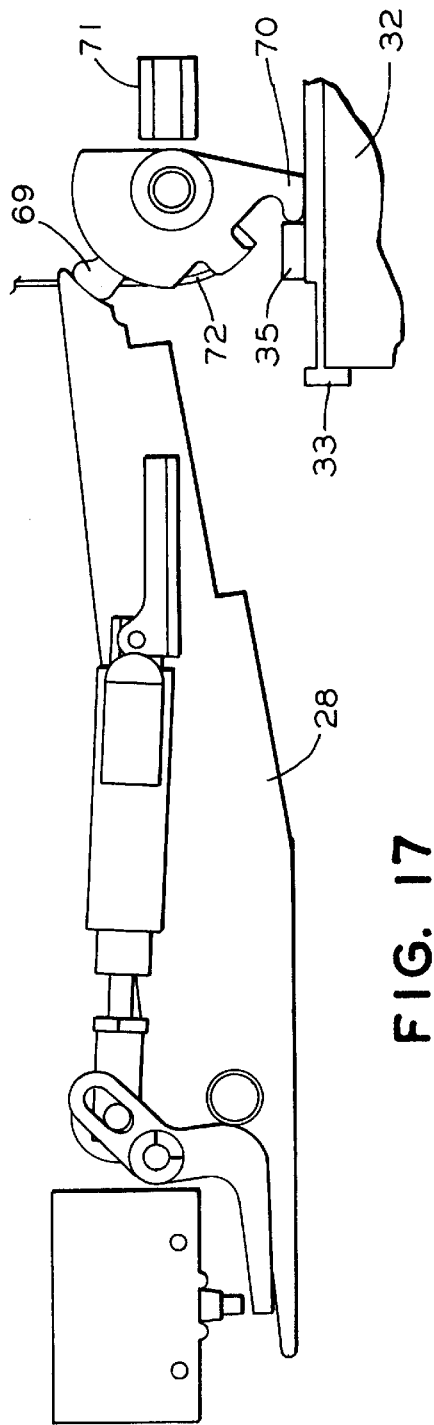

TRANSIT VEHICLE DOOR

FIELD OF THE INVENTION

The present invention relates, in general, to a door for transit vehicles and, more particularly, to a powered door having a novel type of lock for railway transit vehicles.

BACKGROUND OF THE INVENTION

Doors for railway transit vehicles must be designed to function rapidly and safely without the direct observation thereof by an operator of the railway transit vehicle. Such doors generally receive signals from trainlines which direct them to open and close. The trainlines usually are multi-strand electrical communication cables which are connected from car to car down the length of a train. Such doors generally have sensors which provide signals which indicate whether they are open or closed, and those signals are transmitted via the trainlines back to a control system for the train.

The design of transit doors is crucial for the safety of the travelling public, and they function in a hostile environment which includes heavy usage, temperature extremes, vibration and acceleration loads, and spurious electrical signals which may be caused by lightning, by interrupted contact with a third rail, or strong radio signals.

It is therefore highly desirable, and in many jurisdictions required, for the doors and their control system to have a number of safety features. These include:

(1) The doors should have locks so that they cannot be opened by application of opening forces to the doors when the doors are closed, without energization of the motor which is used to open the doors.

(2) The doors should have sensors which indicate whether or not they are locked in the closed position.

(3) No credible failure mode should cause a door to open sufficiently, when the train is moving, for a person to fall out of the railway vehicle.

(4) The doors should be interlocked with the control system of the train so that the train cannot be put in motion until the doors are closed sufficiently that a person cannot fall out of the railway vehicle.

(5) The doors should be interlocked with the control system of the train so that the train cannot exceed a predetermined speed until all the doors are locked in a fully-closed position.

Generally, prior art systems have various layers of safety systems to accomplish the objectives above. The layers of safety systems required in prior art systems themselves contribute to failure modes. Additionally, some prior systems provide motive power for the lock system from the same source as the door activating motor which moves the doors from closed to open and from open to closed. Hence, a spurious electrical signal to the door activating motor may cause the motor to unlock the doors and move them to an open position.

SUMMARY OF THE INVENTION

The present invention is a door system for covering and uncovering an aperture for ingress and egress of passengers in a wall of a transit vehicle. The door system has a first door mounted for movement in a first door closing direction to a first door closed position at least partially covering the aperture and for movement in a first door opening direction to a first door open position at least partially uncovering the aperture, the first door opening direction being opposite to the first door closing direction. The system also has a motor and a drive means connected to the motor and to the first door for moving the first door to the first door closed position and for moving the first door to the first door open position.

The system also includes a second door connected to the drive means for longitudinal movement opposite to the first door, the second door moving in a second door closing direction to a second door closed position at least partially covering the aperture when the first door moves in the first door closing direction, the second door moving in a second door opening direction to a second door open position at least partially uncovering the aperture when the first door moves in the first door opening direction; the second door closing direction being generally opposite to the first door closing direction and the second door opening direction being generally opposite to the first door opening direction. In this manner, the first door and the second door cooperate to cover and uncover the aperture.

Longitudinal acceleration loads and longitudinal gravity loads on the first door are at least partially counterbalanced by longitudinal acceleration loads and longitudinal gravity loads on the second door, the longitudinal loads being communicated between the first door and the second door by the drive means.

The door system also has a door biasing means which operates when the first door is in the first door closed position and the second door is in the second door closed position, the door biasing means exerting a door biasing force tending to move the first door in the opening direction of the first door, and the second door in the opening direction of the second door.

The system has a first door lock member for locking the first door in the first door closed position, the first door lock member being moveable to a first door locking position in which it prevents opening of the first door, and moveable to a first door unlocking position in which it does not prevent opening of the first door, the first door lock member having a first door lock member biasing force tending to move it towards the first door locking position. The system also has a first door unlocking actuator for moving the first door lock member from the first door locking position to the first door unlocking position, and it has a control system for sending a first door unlocking signal to the first door unlocking actuator and for sending a door closing signal to the motor to close the doors and for sending a door opening signal to the motor to open the doors. The door biasing force is reacted by the first door lock member to generate a first door lock member load on the first door lock member, the first door lock member load on the first door lock member preventing movement of the first door lock member from the first door locking position to the first door unlocking position when the motor is not energized so that unlocking of the first door requires, in addition to the first door unlocking signal to the first door unlocking actuator, a door closing signal to the motor to generate a first door closing force to overcome at least a portion of the door biasing force to remove at least a portion of the first door lock member load from the first door lock member before the first door unlocking actuator is able to move the first door lock member from the first door locking position to the first door unlocking position. Hence, the door system cannot be unlocked by any one spurious signal.

OBJECTS OF THE INVENTION

It is, therefore, one of the primary objects of the present invention to provide a door system for railway transit vehicles which has locks for the doors so when the doors are closed and locked, they cannot be opened by a force on the doors in the door opening direction, or in any other direction.

Another object of the present invention is to provide a door lock for railway transit vehicles which cannot be unlocked by any one spurious signal.

A further object of the present invention is to provide a door lock for railway transit vehicles which cannot be unlocked unless at least two signals occur simultaneously.

An additional object of the present invention is to provide a door lock for railway transit vehicles which, to unlock, requires a signal to an unlocking actuator to urge a lock member toward an unlocking position and, at the same time, a signal to energize a motor to exert a force on the door in the door closing direction.

It is also an object of the present invention to provide a door lock for railway transit vehicles which is prevented from moving to an unlocking position upon receipt of a spurious unlocking signal by a load on the lock member caused by a biasing force on the door when it is in the closed position.

Another object of the present invention is to provide a door lock for railway transit vehicles which is prevented from moving to an unlocking position upon receipt of a spurious unlocking signal by a load on the lock member caused by a biasing force on the door when it is in the closed position, wherein the biasing force is provided by a door closure seal.

A further object of the present invention is to provide a door lock for railway transit vehicles which has a pushback position so that if an object is caught by the door when it is closing, the door can be opened to the pushback position to free the object that is caught, the pushback position being such that a passenger cannot fall out of the door when it is in the pushback position.

Yet another object of the present invention is to provide a door system for railway transit vehicles which has sensors which indicate whether or not the doors are closed and fully locked.

Still another object of the present invention is to provide a door system for railway transit vehicles which has a pushback position and a sensor to indicate that the door is closed to at least the pushback position.

It is yet another object of the present invention to provide a door system for a railway transit vehicle in which no credible failure mode would cause a door to open sufficiently for a passenger to fall out of the vehicle.

A further object of the present invention is to provide a door system for a railway transit vehicle which may be interlocked with the control system of the vehicle so that the vehicle cannot be put in motion until the doors are closed sufficiently that a person cannot fall out of the railway vehicle.

Another object of the present invention is to provide a door system for railway transit vehicles which can be interlocked with the control system for the train so that the train cannot exceed a predetermined speed until all the doors are locked in a fully-closed position.

An additional object of the present invention is to provide a door system for railway transit vehicles which is insensitive to spurious electrical signals caused by lightning, interrupted contact with a third rail, or radio signals.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

BRIEF DESCRIPTION OF THE DRAWINGS

FIG. 12 shows the lock arm in the fully locked position, and the lock arm engaging the lock position sensor.

FIG. 13 shows a latch member being engaged by a protuberance on the contact bracket of the door hanger.

FIG. 16 shows an emergency release rotor moving the lock member to the unlocking position.

FIG. 17 shows the emergency release moving the door to a slightly opened position.

Figure 1:
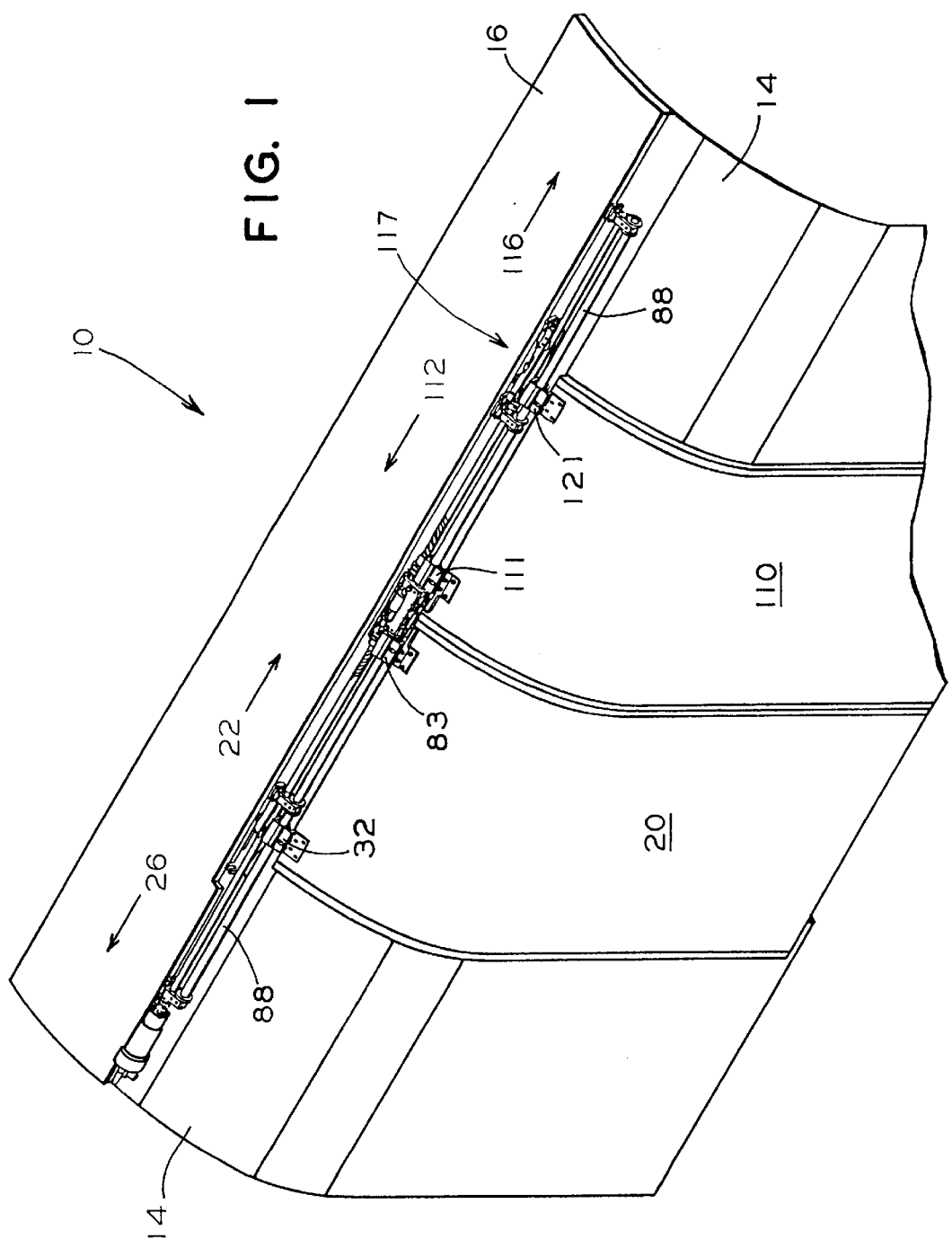
FIG. 1 shows a pair of bi-parting doors in a wall of a transit vehicle, the doors being in a closed position.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing Figures, for the sake of clarity and understanding of the invention.

Figure 2:
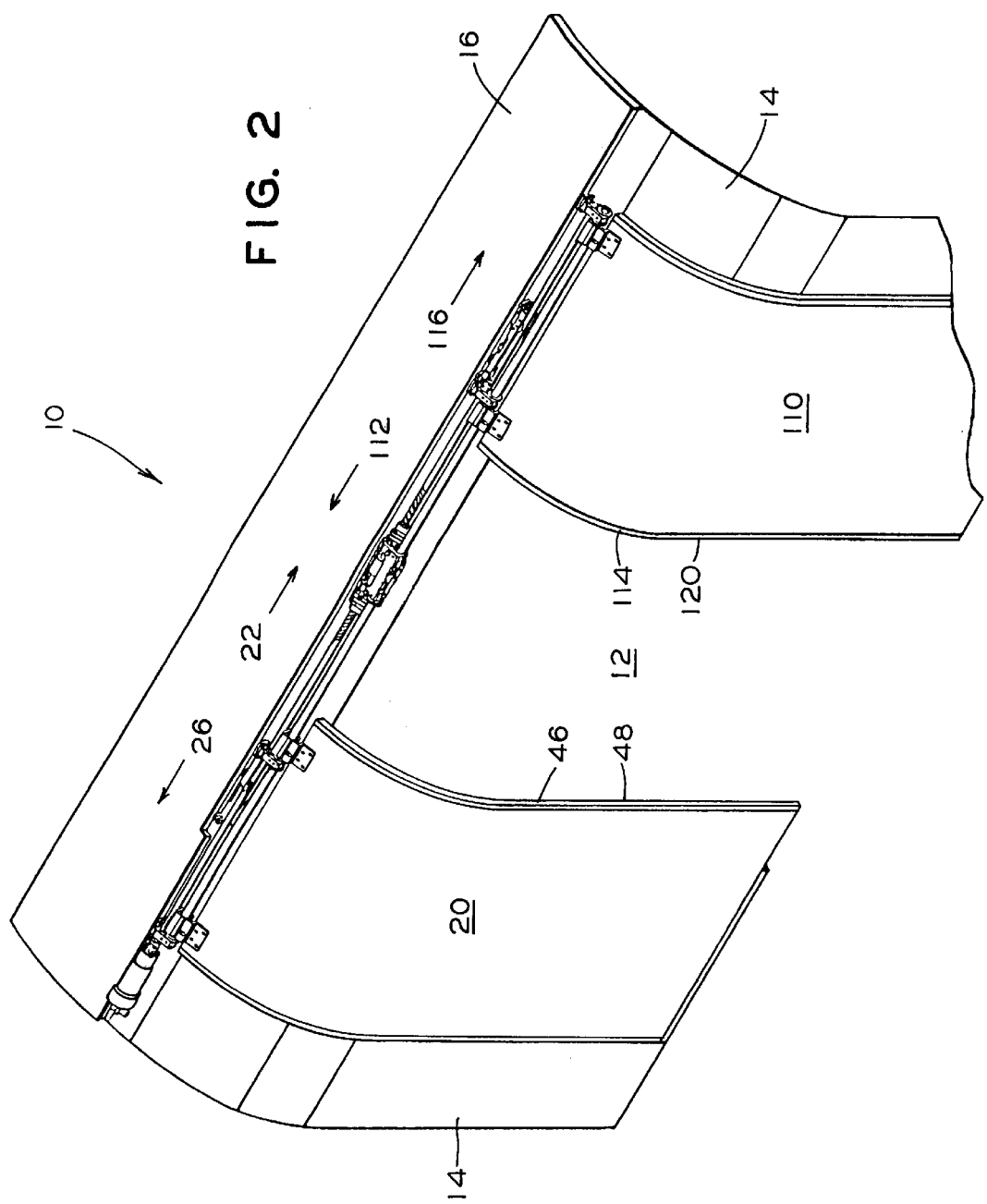
FIG. 2 shows a pair of bi-parting doors in a wall of a transit vehicle, the doors being in an open position.
Figure 3:
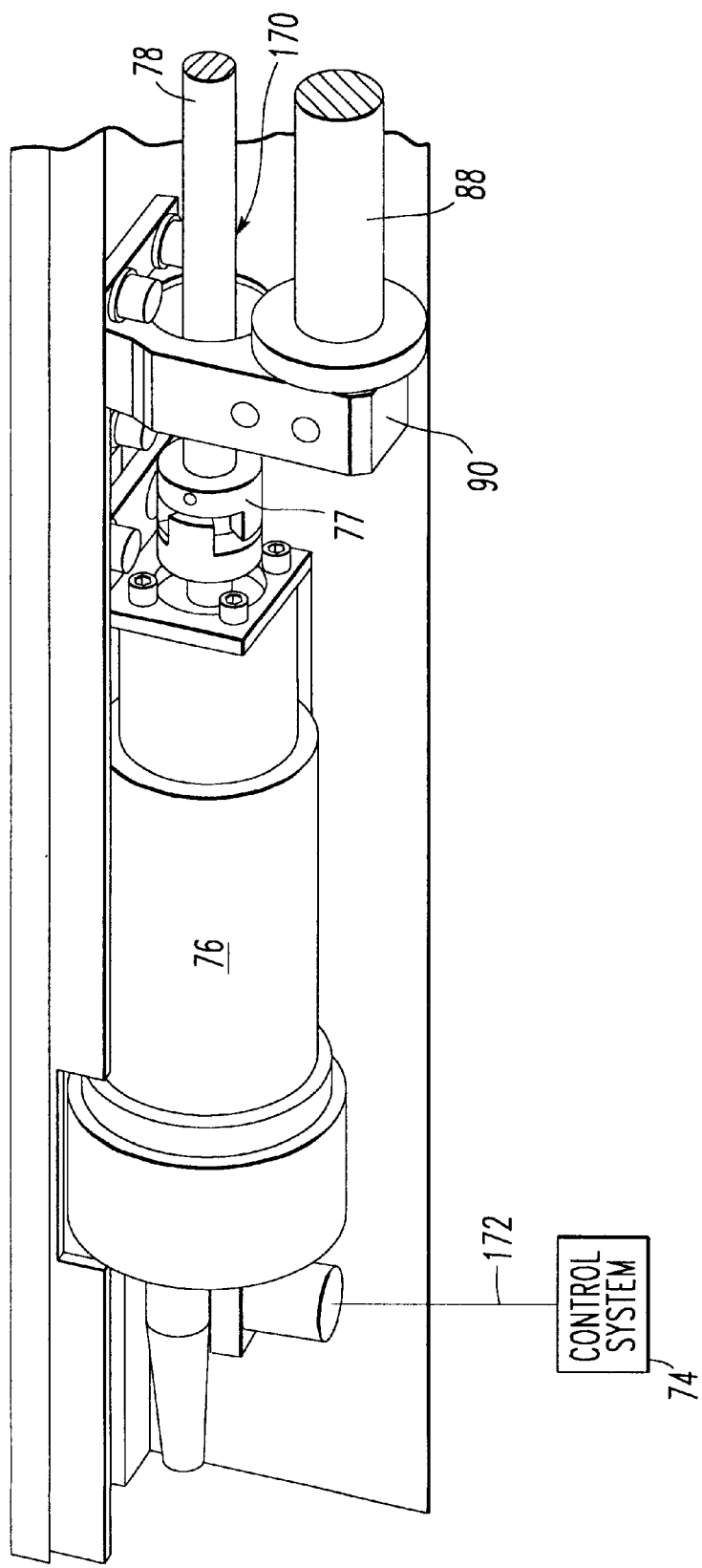
FIG. 3 shows the motor, a portion of the drive means, a support rod, and a rod hanger.

FIGS. 1 and 2 show perspective drawings of a presently preferred embodiment of the invention. These Figures show a transit vehicle door system, generally designated 10, for covering and uncovering an aperture 12 for ingress and egress of passengers in a wall 14 of a transit vehicle 16. The door system 10 has a first door 20 mounted for movement in a first door closing direction 22 to a first door closed position at least partially covering aperture 12 and for movement in a first door opening direction 26 to a first door open position at least partially uncovering aperture 12, the first door opening direction 26 being opposite to the first door closing direction 22. The closed position is shown in FIG. 1 and the open position is shown in FIG. 2. FIG. 3 shows a motor 76 and a drive means, generally indicated 170, connected to motor 76 and to the first door 20 for moving first door 20 to the first door closed position and for moving first door 20 to the first door open position.

Door system 10 also has a second door 110 connected to the drive means 170 for longitudinal movement opposite to the first door 20, the second door 110 moving in a second door closing direction 112 to a second door closed position at least partially covering aperture 12 when first door 20 moves in the first door closing direction 22, and second door 110 moving in a second door opening direction 116 to a second door open position at least partially uncovering aperture 12 when first door 20 moves in the first door opening direction 26. The second door closing direction 112 is generally opposite to the first door closing direction 22 and the second door opening direction 116 is generally opposite to the first door opening direction 26. Hence, the first door 20 and the second door 110 cooperate to cover and uncover the aperture 12, as shown in FIGS. 1 and 2. Also, longitudinal acceleration loads and longitudinal gravity loads on the first door 20 are at least partially counterbalanced by longitudinal acceleration loads and longitudinal gravity loads on the second door 110, the longitudinal loads being communicated between the first door 20 and the second door 110 by a portion of the drive means 170 which includes center coupling 104. Drive means 170 includes coupling 77 which connects motor 76 to shaft 78, coupling 81 connecting shaft 78 to first screw 80, center coupling 104 connecting first screw 80 to second screw 102, nut assembly 150 for first door 20 and nut assembly 190 for the second door 110.

Door system 10 has a door biasing means, which preferably includes a seal, 46 attached to edge 48 of first door 20, as shown in FIG. 2. Door biasing means 46 is operable when the first door 20 is in the first door closed position and the second door 110 is in the second door closed position, the door biasing means 46 exerting a door biasing force tending to move the first door 20 in the first door opening direction 26 and to move the second door 110 in the second door opening direction 116, the door biasing force being communicated between the first door and the second door by the drive means 170. Preferably, a seal 120 is also attached to edge 114 of second door 110.

Figure 5:
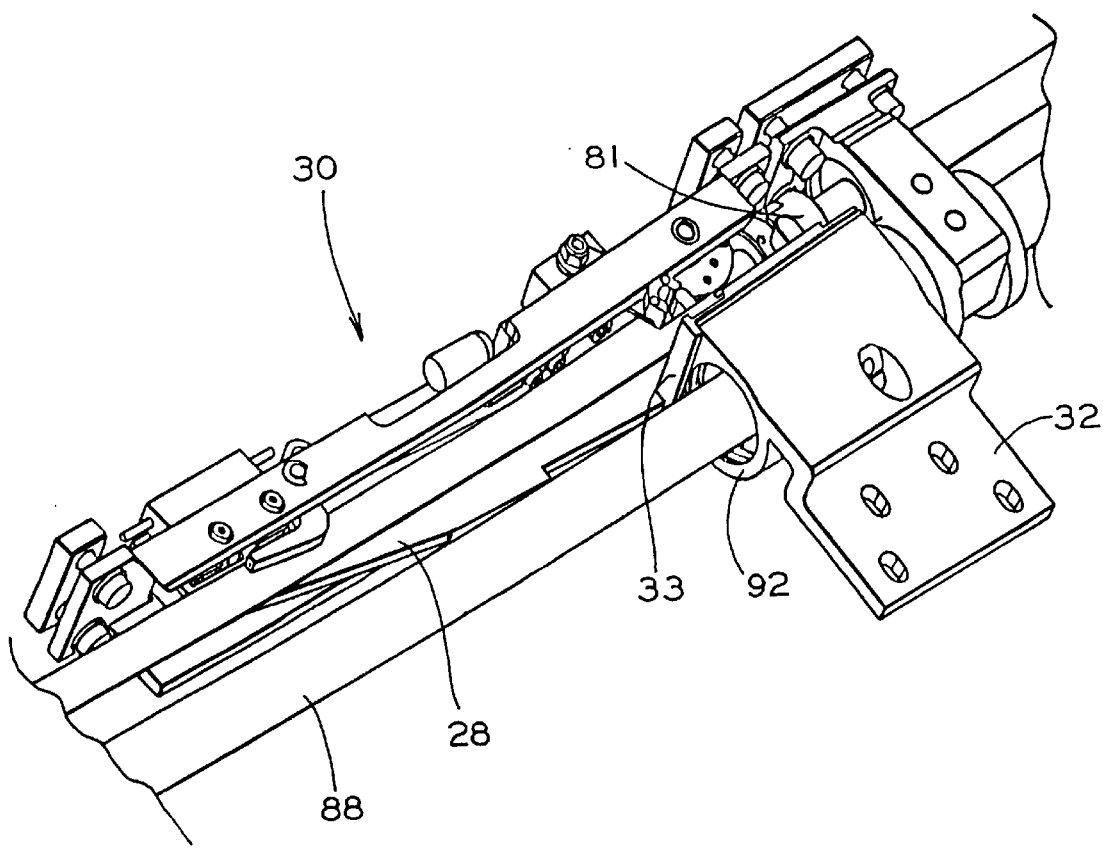
FIG. 5 shows a closeup of the lock assembly with the door hanger in the fully closed and locked position.
Figure 6:
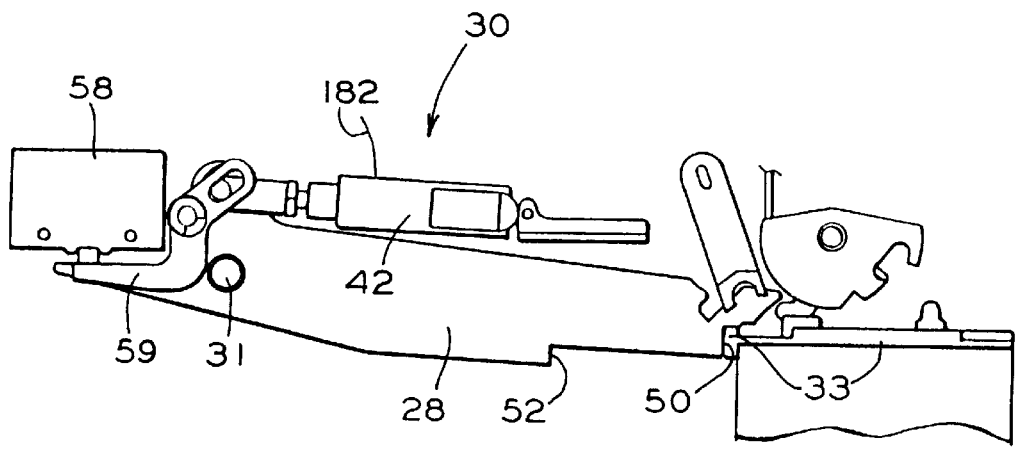
FIG. 6 shows the lock arm in the fully locked position, with the contact bracket of the door hanger engaging the lock step portion of the lock arm.
Figure 8:
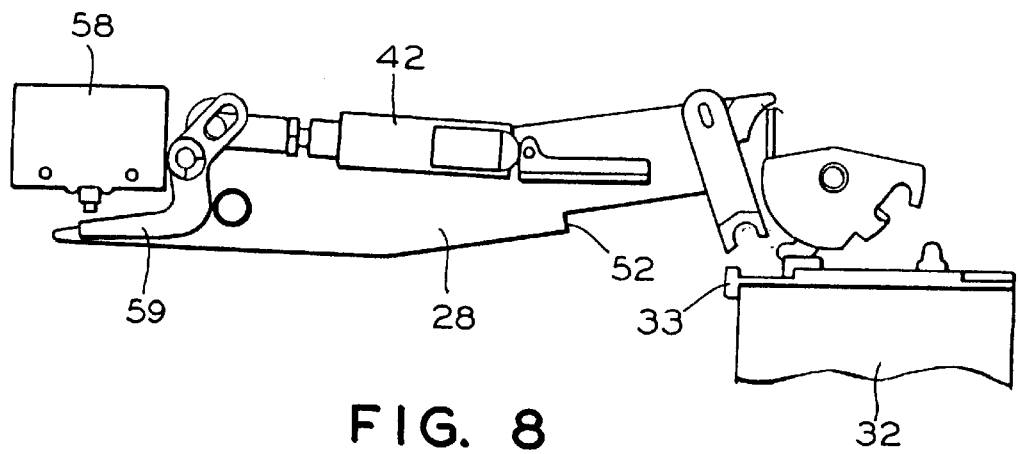
FIG. 8 shows the lock arm in the unlocked position, in which it is lifted above the contact bracket of the door hanger.

Door system 10 also has a first door lock assembly, generally designated 30, having a first door lock member 28 for locking the first door 20 in the first door closed position, the first door lock member 28 being moveable to a first door locking position, shown in FIGS. 5 and 6, in which it prevents opening of first door 20, and moveable to a first door unlocking position, as shown in FIG. 8, in which it does not prevent opening of the first door 20. The first door lock member 28 has a first lock member biasing force tending to move it towards the first door locking position.

Figure 9:
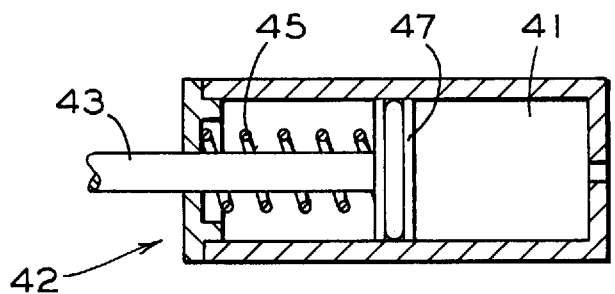
FIG. 9 shows the internals of a fluid pressure actuator which, when pressurized, lifts the lock arm to the unlocking position.
Figure 10:
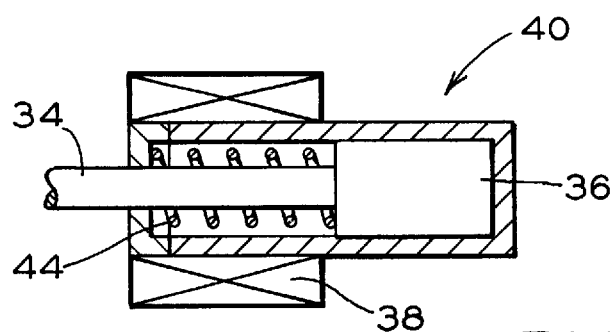
FIG. 10 shows an electromagnetic actuator which, when energized, lifts the lock arm to the unlocking position.

The first door lock assembly 30 has a first door unlocking actuator, which preferably is fluid pressure actuator 42, as shown in FIGS. 6 and 9, or, alternately, may be electrical actuator 40, shown in FIG. 10, for moving the first door lock member 28 from the first door locking position to the first door unlocking position. Fluid pressure actuator 42, preferably, is a pneumatic actuator.

FIG. 3 shows a control system 74 for sending a door closing signal to the motor 76 through connection 172 to close the first door 20 and the second door 110 and for sending a door opening signal to motor 76 to open first door 20 and second door 110. FIG. 6 shows connection 182 for conveying a first door unlocking signal to the first door unlocking actuator 42 from control system 74.

At least a portion of the door biasing force is reacted by the first door lock member 28 to generate a first door lock member load on the first door lock member 28, the first door lock member load on the first door lock member 28 preventing movement of the first door lock member 28 from the first door locking position to the first door unlocking position when the motor 76 is not energized so that unlocking of the first door 20 requires, in addition to the first door unlocking signal to the first door unlocking actuator 42, a door closing signal to motor 76 to generate a first door closing force to overcome at least a portion of the door biasing force to remove at least a portion of the first door lock member load from the first door lock member 28 before the first door unlocking actuator 42 or 40 is able to move the first door lock member 28 from the first door locking position to the first door unlocking position whereby the door system 10 cannot be unlocked by a single spurious signal to either motor 76 or to the first door unlocking actuator 40 or 42.

In the presently preferred embodiment, as shown in FIGS. 5 and 6, lock step 50 of lock member 28, when in the locking position, engages contact bracket 33 on first door outer hanger 32. First door outer hanger 32 serves as a trailing edge support for door 20.

In the presently preferred embodiment, lock member 28 is pivoted at an off-center pivot 31 so that gravity biases it toward the locking position, as shown in FIG. 6.

It is preferred that additional biasing force be provided by resilient means associated with actuator 40 or 42 to bias first door lock member 28 toward the locking position.

As shown in FIG. 9, for the presently most preferred embodiment, spring 45 is mounted around push rod 43 of fluid pressure actuator 42 which has fluid pressure space 41. Spring 45 is mounted in compression to bias piston 47 toward the right and exert a tension load on push rod 43. When actuator 42 is pressurized, fluid pressure in pressure space 41 pushes piston 47 toward the left to exert a compressive force on push rod 43 to lift first door lock member 28 to the unlocking position.

In the alternative embodiment, electrical actuator 40 has a solenoidal coil 38, which, when energized draws ferromagnetic piece 36 toward the left to exert a compressive force on push rod 34. A non-magnetic spring 44 is placed as shown and mounted in compression to bias ferromagnetic piece 36 toward the right and exert a tension on push rod 34.

Figure 11:
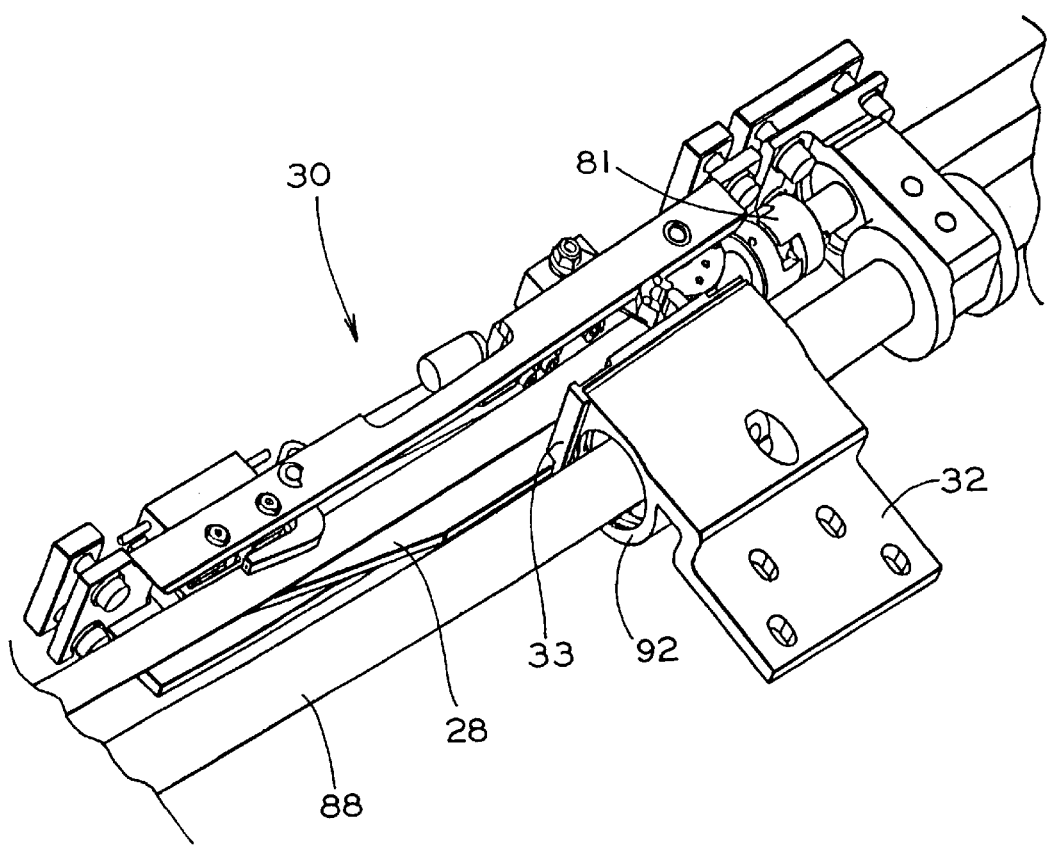
FIG. 11 shows the door hanger in the pushback position, with the contact bracket of the door hanger pressing against the pushback step of the lock arm.

FIG. 11 shows lock member 28 in a pushback position in which contact bracket 33 of first door outer hanger 32 is pressed against pushback step 52 of lock member 28. When the lock member 28 is in the pushback position, if a passenger has a body portion, a garment, or a possession caught by door 20, the passenger may move door 20 in the door opening direction 26 to a door pushback position established by step 52 of lock member 28 so that the passenger may extract the body portion, garment, or possession. When door 20 is in the door pushback position, aperture 12 is sufficiently covered that the passenger cannot pass through aperture 12.

FIG. 6 shows lock member 28, preferably, formed as an arm pivoted about pivot 31 and having a step 50 against which the contact bracket 33 of outer hanger 32 of door 20 abuts when door 20 is in the fully closed position.

Figure 7:
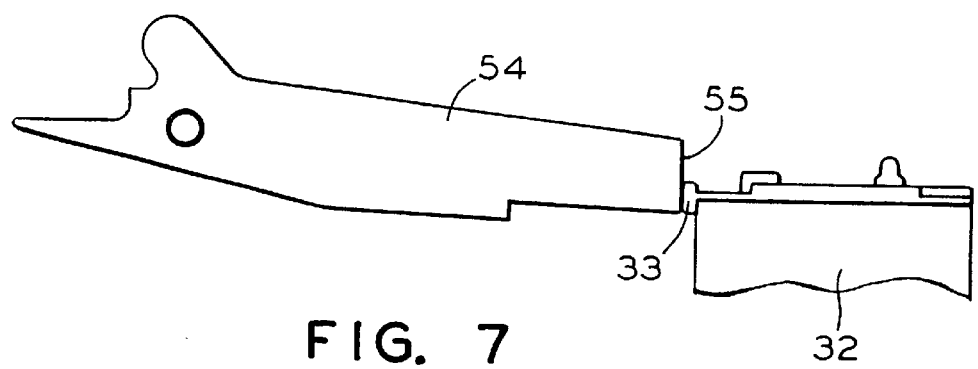
FIG. 7 shows an alternate lock arm in the fully locked position with the contact bracket of the door hanger engaging the end of the lock arm.

FIG. 7 shows an alternate lock member 54 having an end 55 against which contact bracket 33 of outer hanger 32 of door 20 abuts when door 20 is in the fully closed position.

FIGS. 8 and 12 show a lock member pushback sensor 58 which is engaged by sensor arm 59 when lock member 28 is in the pushback position, as shown in FIG. 11. Sensor arm 59 may also engage pushback sensor 58 when lock member 28 is in the locked position, as shown in FIG. 6. Pushback sensor 58 is connected to control system 74 by connection 174 and provides a predetermined signal when lock member 28 is in the pushback position.

FIG. 12 shows pushback sensor 58 cut away to reveal lock arm position sensor 56. Lock arm position sensor 56 is engaged by a portion of lock arm 28 when lock arm 28 is in the fully locked position. Lock arm sensor 56 is connected to control system 74 by connection 176 and provides a predetermined signal when lock member 28 is in the fully locked position. In the preferred embodiment shown, sensor 56 is directly behind sensor 58.

Figure 18:
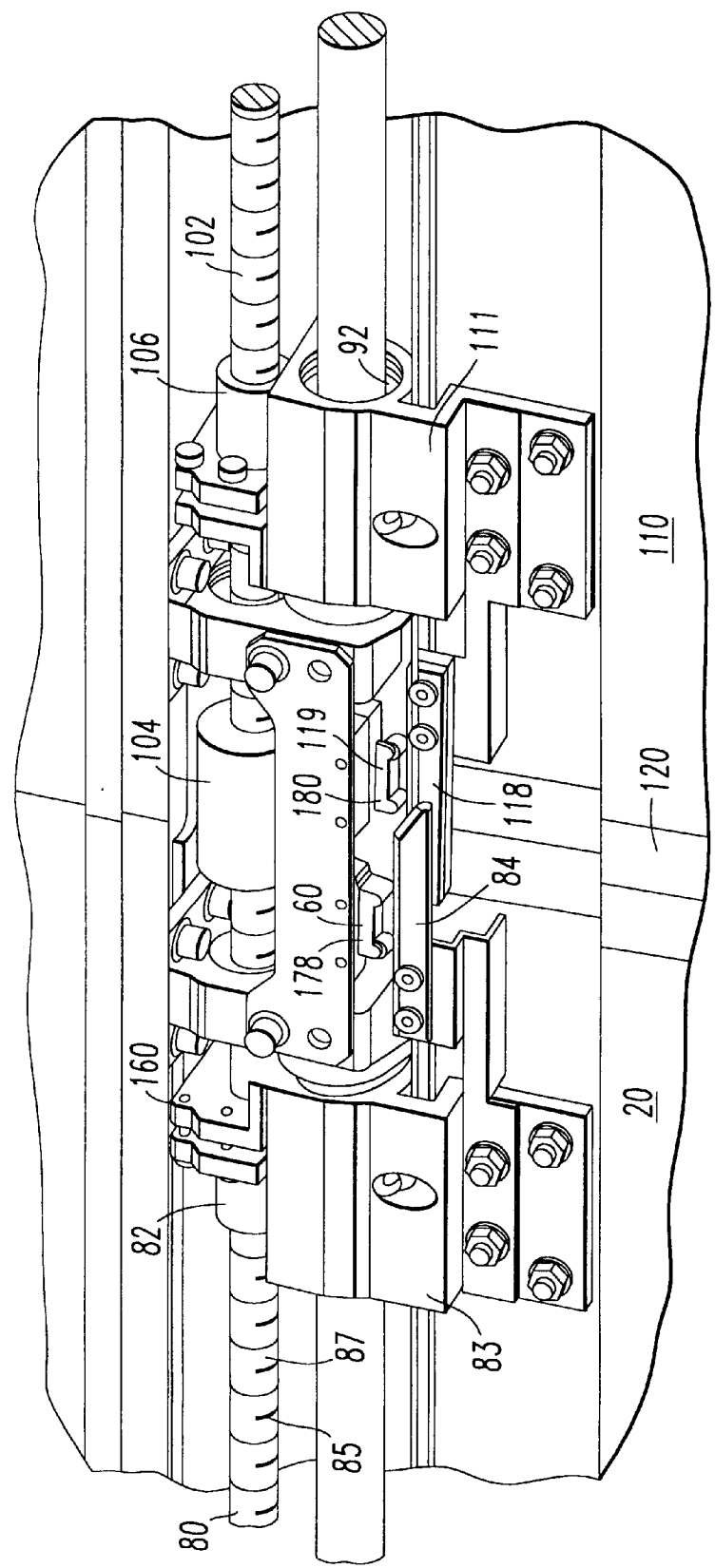
FIG. 18 shows a central portion of the drive means for a pair of bi-parting doors in the closed position.

FIG. 18 shows first door 20 and second door 110 in their closed positions. The first door inner hanger 83 and the second door inner hanger 111 are also shown.

Door system 10 preferably has a first door pushback sensor 60, as shown in FIG. 18. In the preferred embodiment, sensor 60 is engaged by contact strip 84 when first door 20 is in the pushback region, which includes the pushback position. Contact strip 84 is attached to first door inner hanger 83. Sensor 60 provides a predetermined signal when door 20 is in a range of positions including the door pushback position, and it supplies this signal by connection 178 to control system 74.

Likewise, second door pushback sensor 119 is engaged by contact strip 118 when second door 110 is in the pushback region, as shown in FIG. 18. Contact strip 118 is attached to second door inner hanger 111. Second door pushback sensor 119 also is connected by connection 180 to control system 74.

Figure 14:
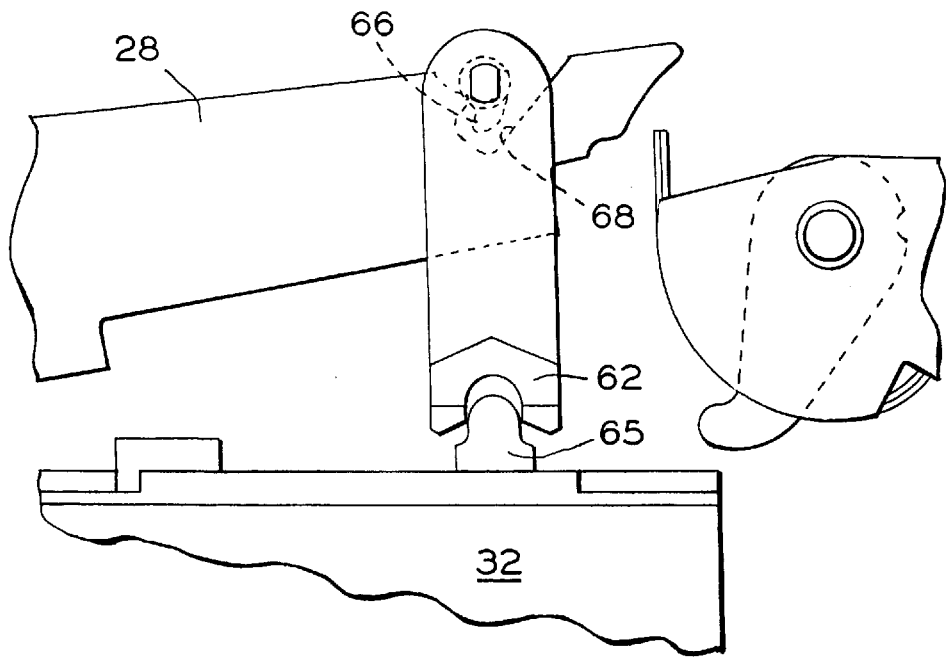
FIG. 14 shows the latch member being rotated by the protuberance.
Figure 15:
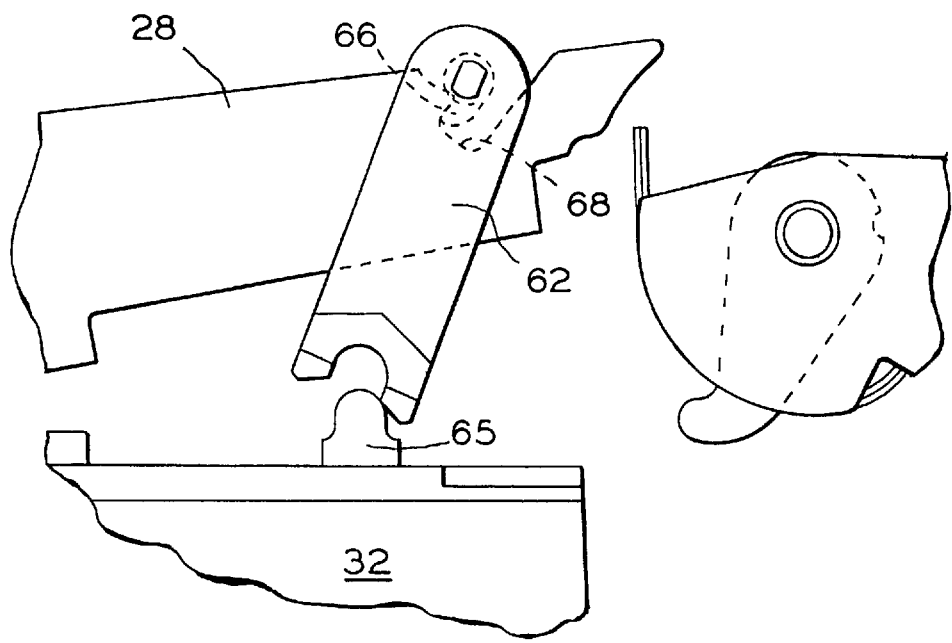
FIG. 15 shows the latch member in position to hold the lock member in the unlocking position.

It is preferred that door system 10 have a latch 62, which is shown in FIGS. 13, 14 and 15. FIG. 13 shows first door outer hanger 32 moved in the first door opening direction 26 so that contact bracket 33 of door hanger 32 has moved past the pushback step 52 on lock member 28. In this Figure, protuberance 65 on contact bracket 33 of door hanger 32 is beginning to engage latch 62.

FIG. 14 shows latch 62 rotated clockwise by protuberance 65. FIG. 15 shows latch 62 rotated further so that latch cam 66 engages cam receptor slot 68 of lock member 28. With the latch in this position, lock member 28 is held in the unlocking position where it remains while door 20 is in the open position outside of the pushback region.

Preferably, door system 10 has an emergency release rotor 64, shown in FIGS. 16 and 17. Emergency release rotor 64 is operable by a person to move the lock member 28 from the locking position to the unlocking position. Preferably, it is activated by release rotor flexible tension member 72 which is pulled to rotate release rotor 64 in the clockwise direction as shown. Flexible tension member 72 may be, for example, a cord, a cable, a strap, a chain, etc.

Release rotor 64 has a first cam 69 which lifts lock arm 28 away from contact bracket 33 of door hanger 32, as shown in FIG. 16. Further rotation of release rotor 64 causes release rotor second cam 70 to engage contact block 35 of contact bracket 33 of first door hanger 32 to move door 20 to a slightly open position. This is done so that a person can see that door system 10 is unlocked and obtain a grip to open door system 10 sufficiently for egress from the transit vehicle 16.

FIG. 18 shows the presently preferred configuration for first screw 80 and second screw 102. These preferably have a pitch of the same magnitude, but opposite threads. One is a right hand screw and the other is a left hand screw. They rotate in the same direction. Second screw 102 is driven by first screw 80 through coupling 104. Coupling 104 communicates rotary motion from first screw 80 to second screw 102, while allowing a slight misalignment. Misalignment may be caused, for example, by sag of transit vehicle 16 due to a load of passengers.

FIG. 18 shows first nut 82 which engages first screw 80 to be translated thereby, and it shows second nut 106 which engages second screw 102 to be translated thereby.

Figure 24:
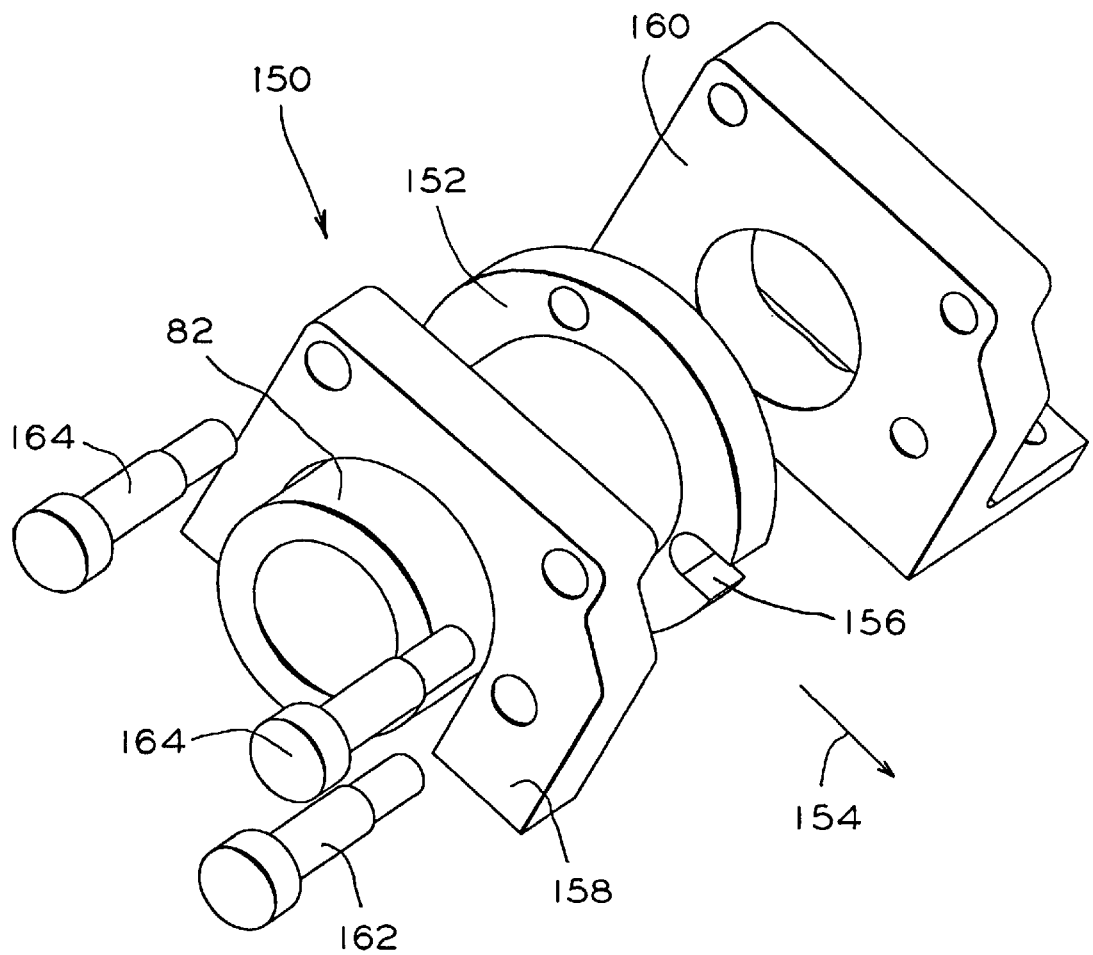
FIG. 24 shows a nut assembly of a helical drive means.

FIG. 24 shows the mounting of first nut 82. Flange 152 of first nut 82 is captured by bracket 158 and bracket 160, which is connected to first door inner hanger 83. Bracket 158 is attached to bracket 160 by shoulder bolts 162 and 164 without pressing on flange 152. Nut 82 is able to move laterally in at least one direction 154, which is perpendicular to screw 80. (Screw 80 is not shown in this figure.) Nut 82 is constrained against rotation by shoulder bolt 162, which passes through notch 156 in flange 152. The feature of allowing nut 82 to move a small distance in the direction 154, due to a possible rotation of first door hanger 83 around rod 88, is included to prevent friction and overloading due to transverse and radial loads between nut 82 and first screw 80.

Figure 25:
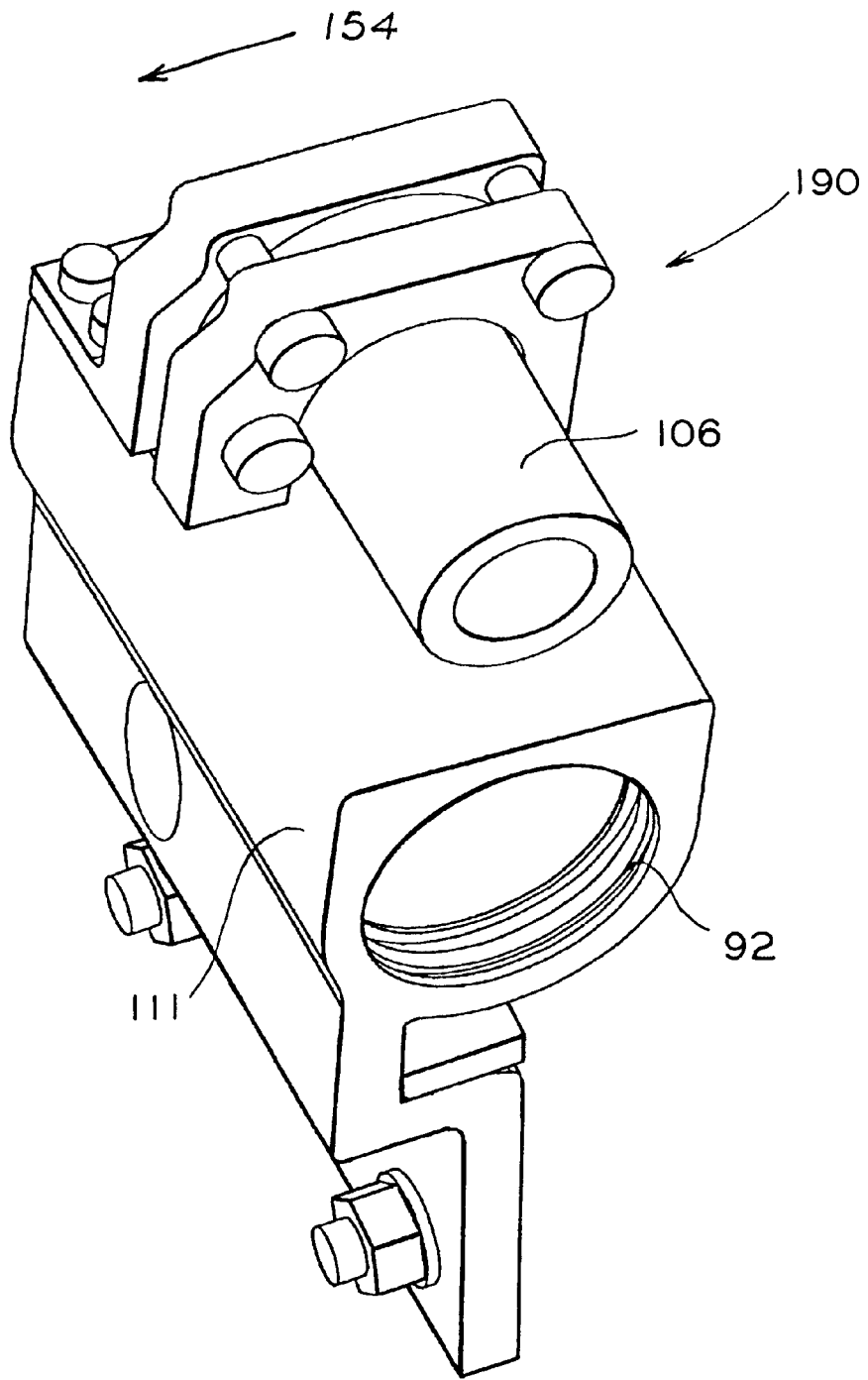
FIG. 25 shows a nut assembly attached to a door hanger.

FIG. 25 shows a similar arrangement for nut 106, which drives second door inner hanger 111, and is mounted to be able to move laterally in direction 154.

FIG. 18 shows a presently preferred drive means 170, which includes a first screw 80 having a plurality of helical grooves 87. In the presently preferred embodiment, it has 10 helical grooves formed as generally smooth flutes 87 disposed between an identical number of helical ridges 85. It is preferred that the pitch of the first screw 80 and second screw 102 be sufficiently great that when the door system 10 is not locked, a force on door 20 in first door opening direction 26 or on door 110 in the second door opening direction 116 causes the first screw 80 and second screw 102 to rotate and permit door 20 and door 110 to move in their respective door opening directions 26 and 116. The contacting surfaces of screw 80, nut 82, screw 102 and nut 106 should be smooth and preferably include low friction materials such as low friction fluorocarbon.

Figure 4:
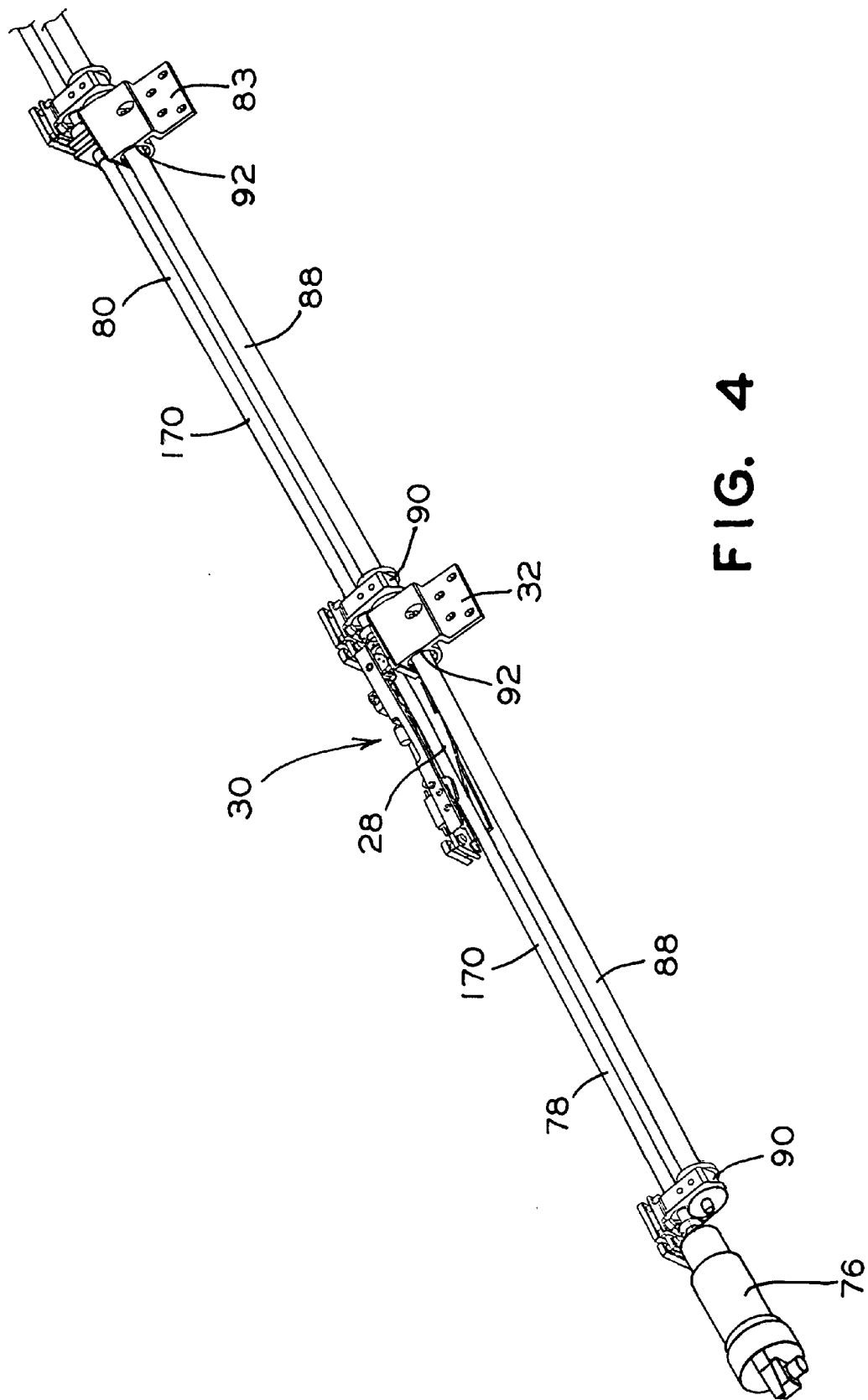
FIG. 4 shows, for a single door, a motor, a drive means, support rod and rod hangers, door hangers and a lock assembly.

FIGS. 1, 4 and 5 show that, in the preferred embodiment, door 20 is suspended from rod 88 by sliding connections 92 on first door outer hanger 32 and first door inner hanger 83, rod 88 being oriented about in a longitudinal direction of the transit vehicle 16. FIG. 3 shows that rod 88 is suspended from rod hanger 90. Contacting surfaces of rod 88 and sliding connections 92 of door hangers 32 and 83 should be smooth and preferably include low friction materials.

Likewise, FIG. 1 shows that in the preferred embodiment, door 110 is suspended from rod 88 by second door inner door hanger 111 and second door outer hanger 121.

Figure 23:
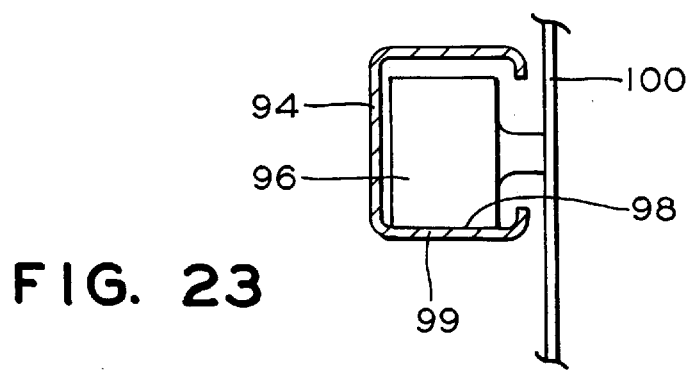
FIG. 23 shows an alternate support means for the doors.

In an alternate embodiment shown in FIG. 23, door 20 is suspended from a beam 94 by a rolling support 96 attached to a hanger 100 of door 20. The beam 94 preferably is a channel beam having a C-shaped cross-section, as shown, and oriented substantially in a longitudinal direction of the transit vehicle 16.

Preferably, the rolling support 96 is confined within the beam and rides on an inner surface 98 of a lower portion 99 of the beam 94.

Figure 19:
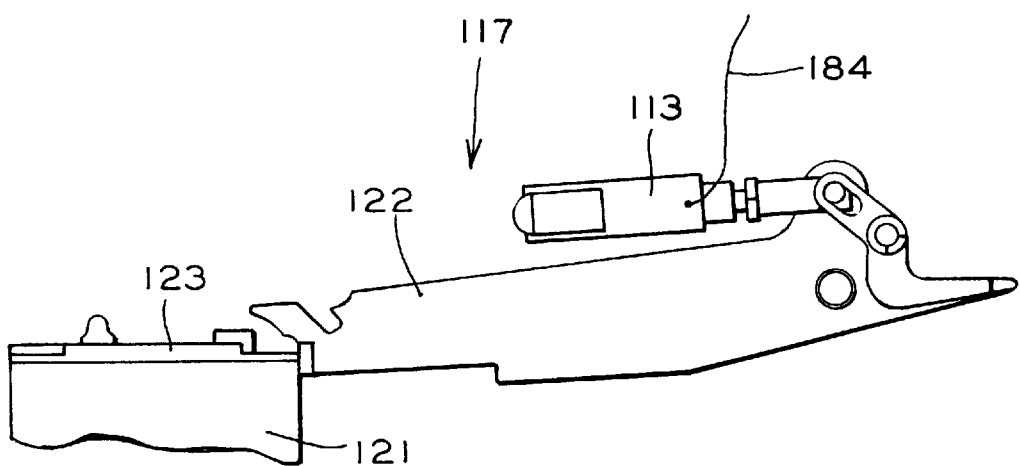
FIG. 19 shows a second lock member for the second door in the locked position.
Figure 20:
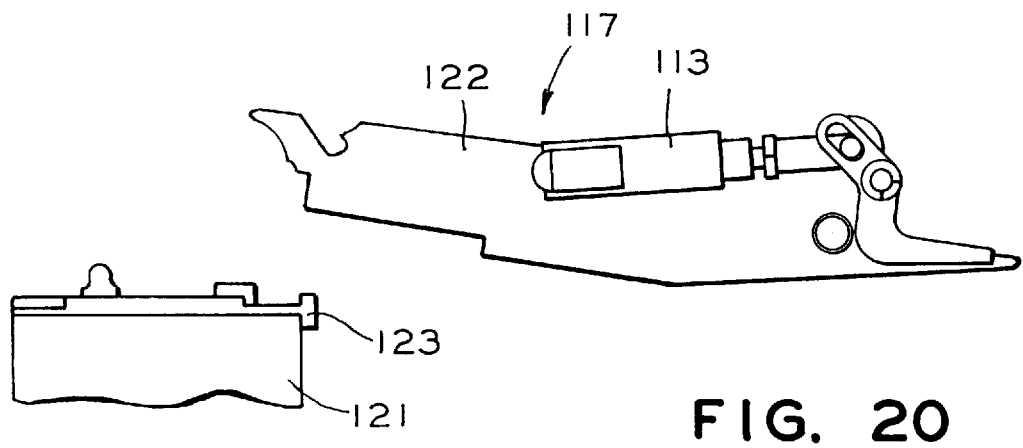
FIG. 20 shows the second lock member in the unlocking position.

In the presently preferred embodiment, door system 10 has a second door lock 117, as shown in FIGS. 1 and 19, for securing second door 110 in the closed position. Preferably, second door lock 117 has a second door lock member 122 and second door unlocking actuator 113 which is connected to control system 74 via connection 184. Preferably, the second door lock member 122 is biased toward a second door locking position, as shown in FIG. 19, in which it presses against contact bracket 123 of second door outer hanger 121, and thereby prevents opening of second door 110. Second door lock member 122 is also moveable by the second door unlocking actuator 113 to a second door unlocking position, shown in FIG. 20, in which it allows opening of second door 110.

It is preferred that at least a portion of the door biasing force be reacted by the second door lock member 122 to generate a second door lock member load on the second door lock member 122, the second door lock member load preventing movement of the second door lock member 122 from the second door locking position to the second door unlocking position when the motor 76 is not energized so that unlocking of the second door 110 requires, in addition to the second door unlocking signal to the second door unlocking actuator 113, a door closing signal to the motor 76 to generate a second door closing force to overcome at least a portion of the door biasing force to remove at least a portion of the second door lock member load from the second door lock member 122 before the second door unlocking actuator 113 is able to move the second door lock member 122 from the second door locking position to the second door unlocking position. Hence, the first door lock member 28 and the second door lock member 122 provide redundant locking of the first door 20 and the second door 110.

Figure 21:
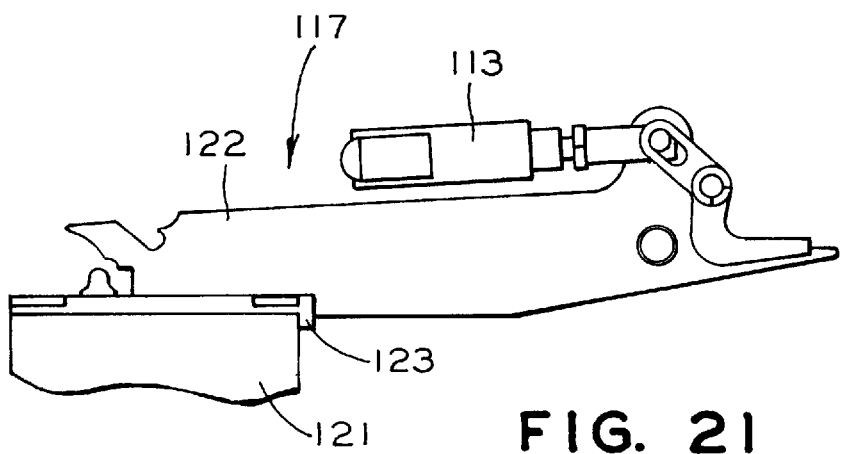
FIG. 21 shows the second lock member in the pushback position.

In the presently preferred embodiment, the second door lock member 122 has a second lock member pushback position, shown in FIG. 21, so that if one of the passengers has a bodily portion, a garment, or another object caught by the second door 110, the passenger may move the second door 110 in the second door opening direction 116 to a second door pushback position established by the second door lock member 122 so that the passenger may extract the body portion, garment, or other object, the aperture 12 being sufficiently covered in the second door pushback position so that the passenger cannot pass through aperture 12 when the second door is in the second door pushback position.

A second emergency release rotor (not shown), similar to emergency release rotor 64 should be provided for emergency release of second lock member 122. The second emergency release rotor should be activated simultaneously with the first emergency release rotor. For example, each may have a flexible tension member, both being activated by the same handle.

Figure 22:
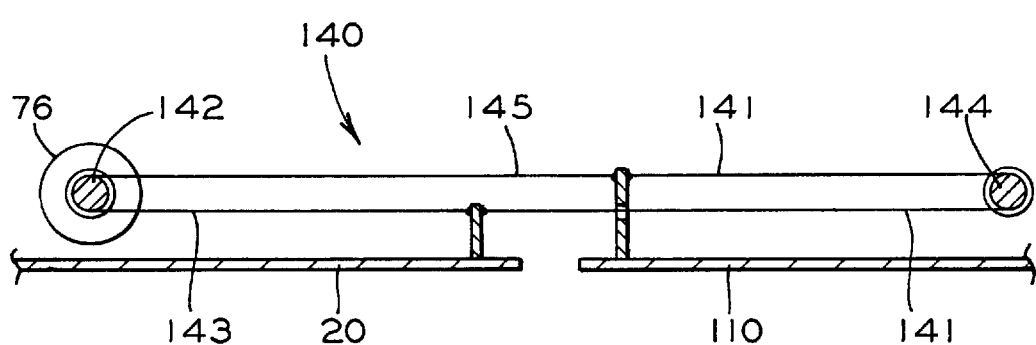
FIG. 22 shows an alternate drive means for the two oppositely-moving doors.

In an alternate embodiment, door system 10 has an alternate drive means 140, as shown in FIG. 22, which includes a flexible tension member 141 passing over direction reversing rotor 142 which is driven by motor 76 and direction reversing rotor 144 to provide a first tension member portion 143 moving oppositely to a second tension member portion 145 when the motor is energized, the first door 20 being connected to the first tension member portion 143 and the second door 110 being connected to the second tension member portion 145 so that energization of the motor 76 for motion causes the first door 20 and the second door 110 to move in opposite directions.

The direction reversing rotors 142 and 144 may be pulleys and the flexible tension member 141 may be, for example, a cord, a cable, a belt, a chain, etc.

While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit of the invention or the scope of the appended claims.

We claim:

1. A door system for enabling ingress and egress of passengers into and out of a transit vehicle, said door system comprising:

a first door mounted for movement in a first door closing direction to a first door closed position to at least partially cover an aperture and for movement in a first door opening direction to a first door open position to at least partially uncover such aperture, said first door opening direction being opposite to said first door closing direction;

a motor;

a drive means connected to said motor and to said first door for moving said first door to said first door closed position and for moving said first door to said first door open position;

a second door connected to said drive means for longitudinal movement opposite to said first door, said second door moving in a second door closing direction to a second door closed position to at least partially cover such aperture when said first door moves in said first door closing direction, said second door moving in a second door opening direction to a second door open position to at least partially uncover such aperture when said first door moves in said first door opening direction, said second door closing direction being generally opposite to said first door closing direction and said second door opening direction being generally opposite to said first door opening direction, so that said first door and said second door cooperate to cover and uncover such aperture and so that longitudinal acceleration loads and longitudinal gravity loads on said first door are at least partially counterbalanced by longitudinal acceleration loads and longitudinal gravity loads on said second door, said longitudinal loads being communicated between said first door and said second door by said drive means;

a door biasing means operable when said first door is in said first door closed position and said second door is in said second door closed position, said door biasing means exerting a door biasing force tending to move said first door in said first door opening direction and to move said second door in said second door opening direction, said door biasing force being communicated between said first door and said second door by said drive means;

a first door lock member for locking said first door in said first door closed position, said first door lock member being moveable to a first door locking position in which it prevents opening of said first door and moveable to a first door unlocking position in which it allows opening of said first door, said first door lock member having a first lock member biasing force tending to move it towards said first door locking position;

a first door unlocking actuator for moving said first door lock member from said first door locking position to said first door unlocking position;

a control system for sending a first door unlocking signal to said first door unlocking actuator and for sending a door closing signal to said motor to close said first door and said second door and for sending a door opening signal to said motor to open said first door and said second door; and at least a portion of said door biasing force being reacted by said first door lock member to generate a first door lock member load on said first door lock member, said first door lock member load on said first door lock member preventing movement of said first door lock member from said first door locking position to said first door unlocking position when said motor is not energized in said door closing direction so that unlocking of said first door requires, in addition to said first door unlocking signal to said first door unlocking actuator, said door closing signal to said motor to generate a first door closing force to overcome at least a portion of said door biasing force to remove at least a portion of said first door lock member load from said first door lock member before said first door unlocking actuator is able to move said first door lock member from said first door locking position to said first door unlocking position whereby said door system cannot be unlocked by a single spurious signal to either said motor or to said first door unlocking actuator.

2. A door system, according to claim 1, wherein said door biasing means includes a flexible seal disposed along an edge of at least one of said first door and said second door for sealing said first door against said second door and for generating said door biasing force on said first door in said first door opening direction and on said second door in said second door opening direction.

3. A door system, according to claim 1, wherein said first door lock member is mounted so that gravity tends to move it into said locking position so that at least a portion of said first door lock member biasing force is due to gravity.

4. A door system, according to claim 1, wherein said door system further includes a resilient member exerting a force on said first door lock member in a locking direction of said first door lock member so that at least a portion of said first lock member biasing force is provided by said resilient member.

5. A door system, according to claim 1, wherein said first door unlocking actuator is one of a fluid pressure actuator and an electromagnetic actuator which, when energized, tends to move said first door lock member to said first door unlocking position.

6. A door system, according to claim 1, wherein said first door lock member has a lock member pushback position so that if one of such passengers has at least one of a body portion, a garment and another object caught by said door system, such passenger may move said first door in said first door opening direction to a first door pushback position established by said first door lock member so that such passenger may extract such at least one of such body portion, such garment and such another object, such aperture being sufficiently covered in said first door pushback position so that such passenger cannot pass through such aperture when said first door is in said first door pushback position.

7. A door system, according to claim 6, wherein said first door lock member has a pushback step against which said first door abuts when said first door is in said first door pushback position.

8. A door system, according to claim 6 wherein said door system further includes a sensor which provides a predetermined signal when said first door lock member is in said lock member pushback position.

9. A door system, according to claim 6, having a sensor which provides a predetermined signal when said first door is in a range of positions including said first door pushback position.

10. A door system, according to claim 6, having a latch which maintains said first door lock member in said first door unlocking position when said first door is opened beyond said first door pushback position.

11. A door system, according to claim 1, wherein said first door lock member is formed as a pivoted arm having at least one of a lock step and an end against which said first door abuts when said first door is in said closed position.

12. A door system, according to claim 1, wherein said door system further includes a sensor which provides a predetermined signal when said first door lock member is in said first door locking position.

13. A door system, according to claim 1, having an emergency release operable by a person to move said first door lock member from said first door locking position to said first door unlocking position.

14. A door system, according to claim 13, wherein said emergency release comprises a rotor having a first cam which moves said first door lock member to said first door unlocking position and a second cam which moves said first door sufficiently in said first door opening direction that a portion of such aperture is uncovered so that a person can see that said door system is unlocked and obtain a grip to open said door system sufficiently for egress from such transit vehicle.

15. A door system, according to claim 14, having a flexible tension member wrapped around at least a portion of said rotor so that a person may pull said flexible tension member to unlock said first door.

16. A door system, according to claim 1, wherein said drive means includes:

a first screw which engages a first nut connected to said first door, said first screw being rotated by said motor to cause translation of said first nut, said first nut being constrained against rotation of said first screw; and a second screw which engages a second nut connected to said second door, said second screw being rotated by said motor to cause translation of said second nut connected to said second door, said second nut being constrained against rotation of said second screw, said first screw and said second screw having a same pitch, opposite thread sense and having a same rotation.

17. A door system, according to claim 16, wherein a pitch of said first screw and a pitch of said second screw are sufficiently great that when said door system is not locked, a force on one of said first door in said first door opening direction and said second door in said second door opening direction causes each said screw to rotate and permit said first door to move in said first door opening direction and said second door to move in said second door opening direction.

18. A door system, according to claim 16, wherein said second screw has a thread opposite to a thread of said first screw and said second screw is connected to said first screw to rotate with said first screw.

19. A door systems according to claim 18, wherein said second screw is substantially in line with said first screw and is connected to said first screw by a coupling.

20. A door system, according to claim 16, wherein said first nut is free to move in at least one direction perpendicular to said first screw so that transverse and radial forces between said first screw and said first nut are minimized.

21. A door system, according to claim 16, wherein said second nut is free to move in at least one direction perpendicular to said second screw so that transverse and radial forces between said second screw and said second nut are minimized.

22. A door system, according to claim 1, wherein said first door and said second door are suspended from at least one rod by sliding connections on hangers of said doors, said at least one rod being oriented substantially in a longitudinal direction of such transit vehicle.

23. A door system, according to claim 1, wherein said first door and said second door are suspended from at least one beam by rolling supports attached to hangers of said doors, said at least one beam being oriented substantially in a longitudinal direction of such transit vehicle.

24. A door system, according to claim 23, wherein said at least one beam has a C-shaped cross section and said rolling supports are confined within said at least one beam and ride on an inner surface of a lower portion of said at least one beam.

25. A door system, according to claim 1, wherein said door system includes a second door lock for locking said second door in said second door closed position, said second door lock having a second door unlocking actuator connected to said control system for receiving a second door unlocking signal from said control system.

26. A door systems according to claim 25, wherein said second door lock has a second door lock member for locking said second door in said second door closed position, said second door lock member being biased toward a second door locking position in which it prevents opening of said second door, and moveable by said second door unlocking actuator to a second door unlocking position in which it allows opening of said second door; and at least a portion of said door biasing force being reacted by said second door lock member to generate a second door lock member load on said second door lock member, said second door lock member load on said second door lock member preventing movement of said second door lack member from said second door locking position to said second door unlocking position when said motor is not energized so that unlocking of said second door requires, in addition to said second door unlocking signal to said second door unlocking actuator, said door closing signal to said motor to generate a second door closing force to overcome at least a portion of said door biasing force to remove at least a portion of said second door lock member load from said second door lock member before said second door unlocking actuator is able to move said second door lock member from said second door locking position to said second door unlocking position so that said first door lock member and said second door lock member provide redundant locking of said first door and said second door.

27. A door system, according to claim 1, wherein said drive means includes a flexible tension member passing over a direction reversing rotor to provide a first tension member portion moving oppositely to a second tension member portion when said motor is energized, said first door being connected to said first tension member portion and said second door being connected to said second tension member portion so that energization of said motor for motion causes said first door and said second door to move in opposite directions.

* * * * *